(12) United States Patent
Hegrat et al.

(10) Patent No.: US 11,870,788 B2
(45) Date of Patent: Jan. 9, 2024

(54) UTILIZING A MACHINE LEARNING MODEL TO DETERMINE REAL-TIME SECURITY INTELLIGENCE BASED ON OPERATIONAL TECHNOLOGY DATA AND INFORMATION TECHNOLOGY DATA

(71) Applicant: Accenture Global Solutions Limited, Dublin (IE)

(72) Inventors: Bradford Henry Hegrat, Montville, OH (US); Douglas Ray Wylie, Eastlake, OH (US)

(73) Assignee: Accenture Global Solutions Limited, Dublin (IE)

( * ) Notice: Subject to any disclaimer, the term of this patent is extended or adjusted under 35 U.S.C. 154(b) by 405 days.

(21) Appl. No.: 17/243,228

(22) Filed: Apr. 28, 2021

(65) Prior Publication Data
US 2022/0353276 A1    Nov. 3, 2022

(51) Int. Cl.
*G06N 20/00* (2019.01)
*G06N 5/04* (2023.01)
*H04L 9/40* (2022.01)

(52) U.S. Cl.
CPC ........... *H04L 63/1416* (2013.01); *G06N 5/04* (2013.01); *G06N 20/00* (2019.01)

(58) Field of Classification Search
CPC ....... H04L 63/1416; G06N 20/00; G06N 5/04
USPC .......................................................... 726/23
See application file for complete search history.

(56) References Cited

U.S. PATENT DOCUMENTS

| | | | |
|---|---|---|---|
| 8,280,833 B2* | 10/2012 | Miltonberger | G06N 5/02 706/45 |
| 10,026,049 B2* | 7/2018 | Asenjo | G06Q 10/06 |
| 10,348,570 B1 | 7/2019 | Hegrat et al. | |
| 2002/0082886 A1* | 6/2002 | Manganaris | G06F 21/552 719/318 |
| 2012/0072983 A1* | 3/2012 | McCusker | H04L 63/126 726/22 |
| 2018/0013783 A1* | 1/2018 | Anachi | H04W 12/08 |
| 2018/0063178 A1* | 3/2018 | Jadhav | H04L 63/1433 |
| 2018/0077195 A1* | 3/2018 | Gathala | H04L 63/1433 |
| 2018/0091453 A1* | 3/2018 | Jakobsson | H04L 63/1441 |
| 2018/0367561 A1* | 12/2018 | Givental | G06F 21/552 |
| 2020/0151326 A1* | 5/2020 | Patrich | G06F 21/554 |
| 2020/0329058 A1* | 10/2020 | Paine | H04L 63/1466 |
| 2020/0380171 A1* | 12/2020 | Bonat | H04L 67/535 |
| 2021/0073819 A1* | 3/2021 | Hernandez | G06Q 20/4016 |
| 2021/0406152 A1* | 12/2021 | Quemy | G06F 11/3624 |

(Continued)

*Primary Examiner* — Thanh T Le
(74) *Attorney, Agent, or Firm* — Harrity & Harrity, LLP

(57) ABSTRACT

A device may receive historical operational technology data and historical information technology data associated with historical systems and may train a machine learning model with the historical operational technology data and the historical information technology data to generate a trained machine learning model. The device may receive real-time operational technology data and real-time information technology data associated with a system and may process the real-time operational technology data and the real-time information technology data, with the trained machine learning model, to determine a trust score and a risk score for an event or set of events associated with the real-time operational technology data and the real-time information technology data. The device may perform one or more actions based on the trust score and the risk score.

20 Claims, 9 Drawing Sheets

(56) References Cited

U.S. PATENT DOCUMENTS

| | | | |
|---|---|---|---|
| 2022/0004528 A1* | 1/2022 | Medisetti | G06N 20/20 |
| 2022/0245642 A1* | 8/2022 | Venkatasubramaniam | G06Q 20/4016 |
| 2022/0245643 A1* | 8/2022 | Venkatasubramaniam | G06N 3/08 |
| 2022/0245691 A1* | 8/2022 | Venkatasubramaniam | G06N 5/01 |
| 2022/0277082 A1* | 9/2022 | Kumar | G06F 16/24578 |
| 2022/0329630 A1* | 10/2022 | Li | H04L 63/20 |
| 2022/0337611 A1* | 10/2022 | Brazao | H04L 9/0891 |
| 2022/0345484 A1* | 10/2022 | Drozd | H04W 12/67 |
| 2023/0077527 A1* | 3/2023 | Sarkar | H04L 63/1433 705/7.28 |

\* cited by examiner

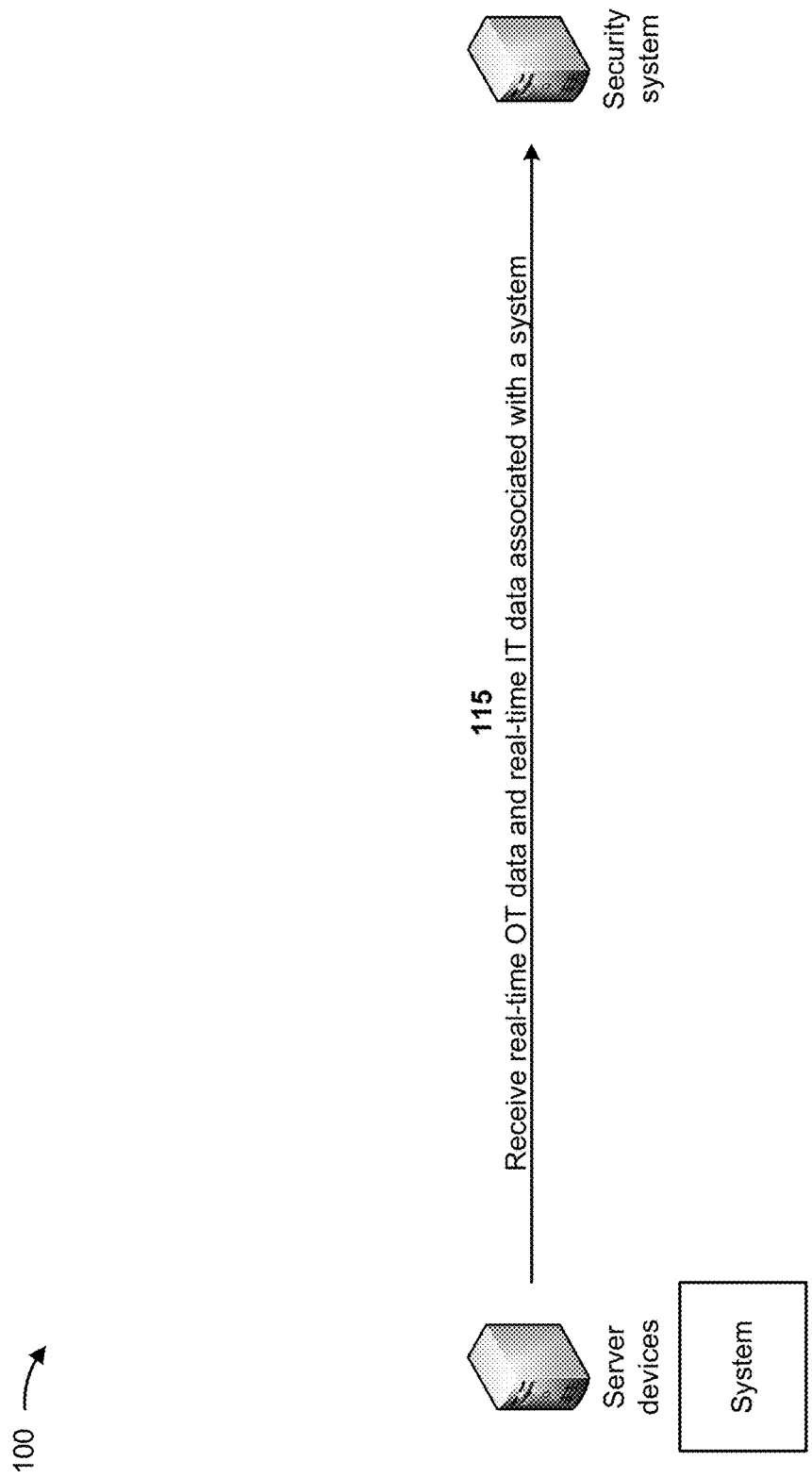

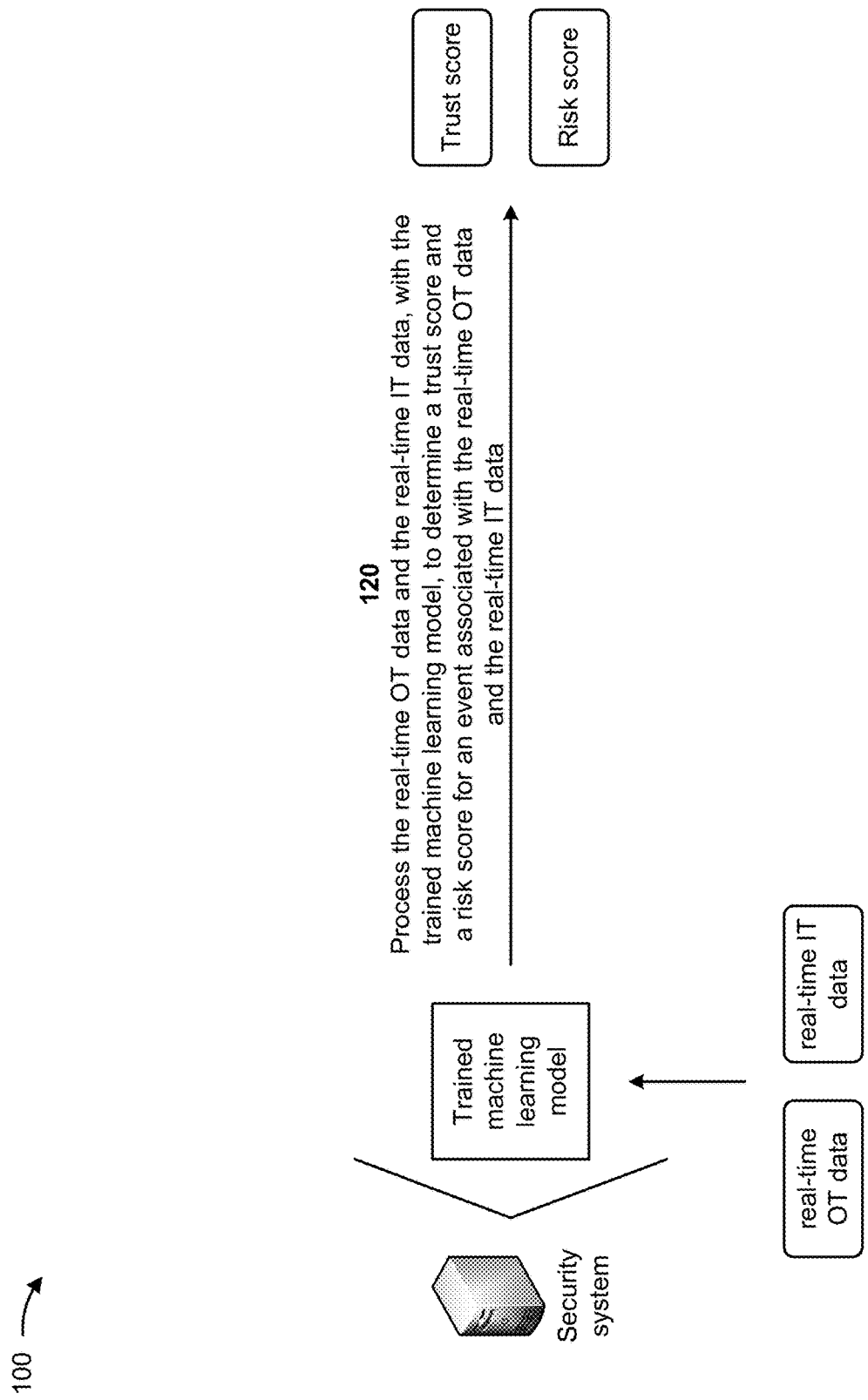

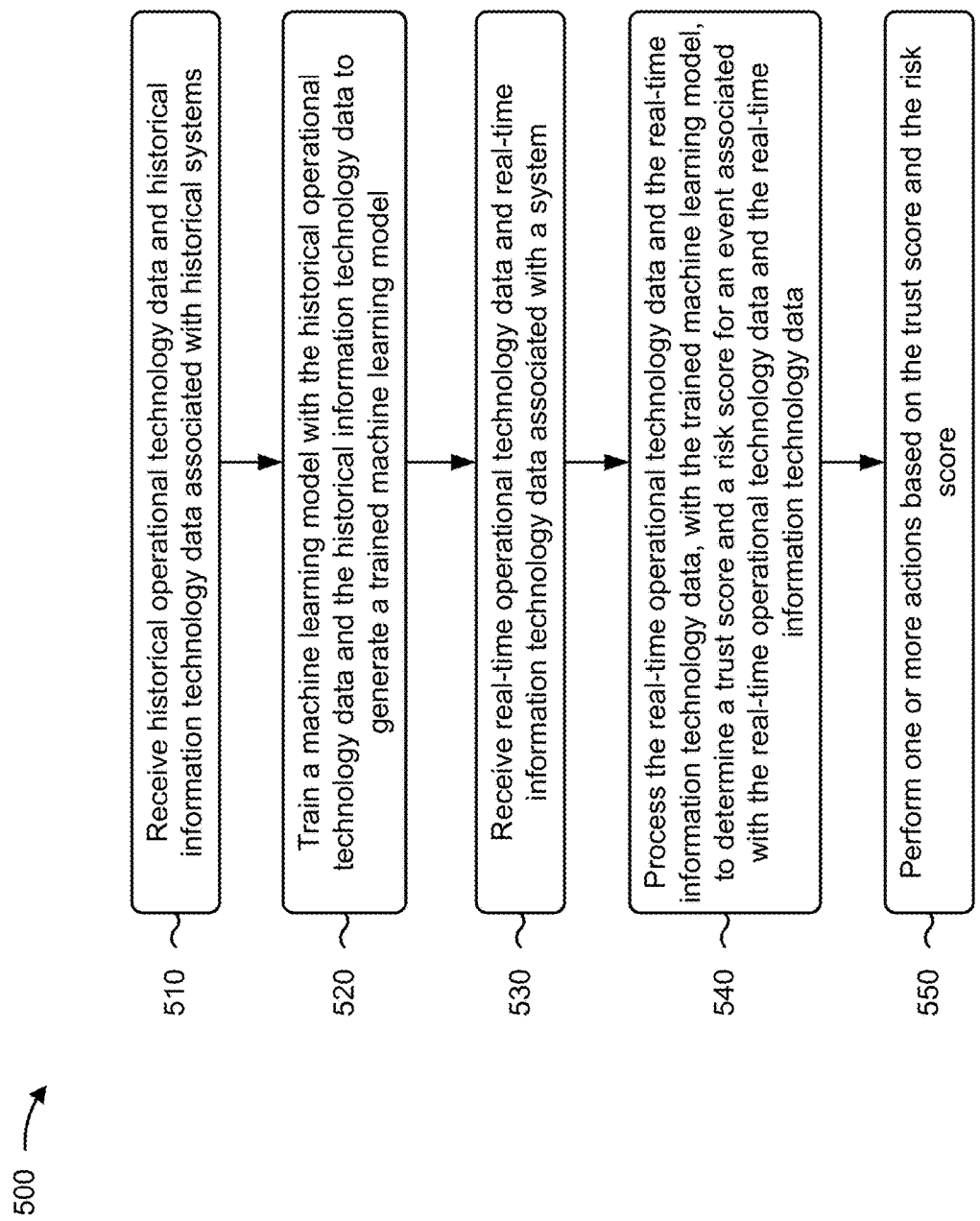

UTILIZING A MACHINE LEARNING MODEL TO DETERMINE REAL-TIME SECURITY INTELLIGENCE BASED ON OPERATIONAL TECHNOLOGY DATA AND INFORMATION TECHNOLOGY DATA

BACKGROUND

Direct and targeted attacks on operational technology (OT) (e.g., industrial control systems, building automation systems, supervisory control and data acquisition systems, Internet of Things (IoT) devices, vehicle control systems, and/or the like) often follow similar attack patterns. For example, an attacker gains access to information technology (IT) systems and direct non-OT systems (e.g., Internet-facing business enterprise networks, network infrastructure and server appliances, an Active Directory server, an employee computer asset, and/or the like), via a phishing attack or other vulnerability, obtains user credentials and/or gains privileges to access networks then pivots through interconnected systems to locate OT cyber physical systems. Once access to OT systems is gained, an attacker may gather data and information about each system's operations, interact with specific OT automation and control devices, alter intra- and internetwork communication patterns or data that are essential to process safety, operational integrity and performance of the cyber physical system. It is also not unusual for adversaries, during the attack process, to also assume a role of an authorized and trusted industrial control system (ICS) engineer or operator, or exploit insecure OT system and device interfaces, leading to particular forensic challenges when victims seek to determine and attribute an attack to malicious or unintentional threats, insider and external threat actors, and associated attack motivations and objectives relating to an OT cyber incident.

SUMMARY

In some implementations, a method may include receiving historical operational technology data relating to the control system devices and physical processes under control and historical information technology data associated with historical events within systems as inputs to supply and train a machine learning model with said historical operational technology data and information technology data to generate a trained machine learning model. The method may also include receiving real-time operational technology data and real-time information technology data associated with a system and its respective constituent devices and physical processes under control, then processing this real-time operational technology data and the real-time information technology data, with the trained machine learning model, to determine a trust score and a risk score for an event associated with the real-time operational technology data and the real-time information technology data. The method may include conveying this processed information, including resulting trust and risk scores outputs from the trained machine learning model, as status, alert, or alarm information to other parties or systems to performing one or more logical or cyber physical actions based on the trust score and the risk score.

In some implementations, a device, whether physical or virtual in nature, includes one or more memories and one or more processors to receive historical operational technology data and historical information technology data associated with historical systems and train a machine learning model with the historical operational technology data and the historical information technology data to generate a trained machine learning model. The trained machine learning model may identify nuances in historical events of the historical systems based on the historical operational technology data and the historical information technology data. The one or more processors may receive real-time operational technology data and real-time information technology data associated with a system and may process the real-time operational technology data and the real-time information technology data, with the trained machine learning model, to determine a trust score and a risk score for an event associated with the real-time operational technology data and the real-time information technology data. The one or more processors may perform one or more actions based on the trust score and the risk score.

In some implementations, a non-transitory computer-readable medium may store a set of instructions that includes one or more instructions that, when executed by one or more processors of a device, whether physical or virtual in nature, cause the device to receive real-time operational technology data and real-time information technology data associated with a system. The one or more instructions may cause the device to process the real-time operational technology data and the real-time information technology data, with a trained machine learning model, to determine a trust score and a risk score for an event associated with the real-time operational technology data and the real-time information technology data. The machine learning model may be trained, based on historical operational technology data and historical information technology data associated with historical systems, to generate the trained machine learning model. The one or more instructions may cause the device, whether physical or virtual in nature, to perform one or more actions based on the trust score and the risk score.

BRIEF DESCRIPTION OF THE DRAWINGS

FIGS. 1A-1E are diagrams of an example implementation described herein.

FIG. 5 is a flowchart of an example process for utilizing a machine learning model to determine real-time security intelligence based on operational technology data and information technology data.

DETAILED DESCRIPTION

Figure 1A:
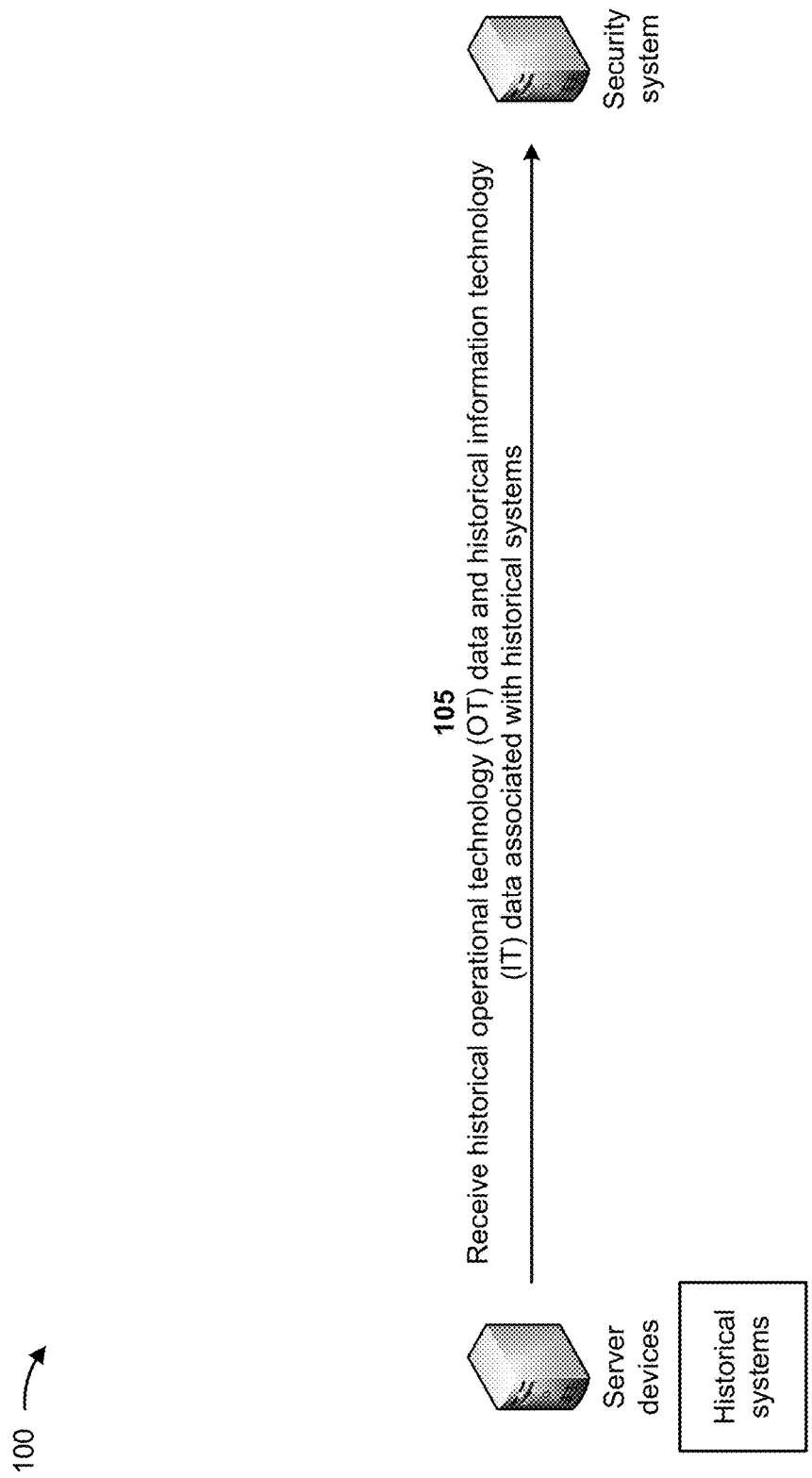

The following detailed description of example implementations refers to the accompanying drawings. The same reference numbers in different drawings may identify the same or similar elements.

Accurate and actionable security monitoring and analysis tools that combine and correlate network communication events, activities, digital outputs and outcomes with process-under-control operational events, activities, digital and physical outputs and outcomes, for operational technology (OT) systems (e.g., industrial control systems, building automation systems, supervisory control and data acquisition systems, Internet of Things (IoT) devices, vehicle control systems, and/or the like) environment currently do not exist. The lack of accurate and actionable security monitoring and event-activity correlation tools for an OT environment may be exacerbated by inherent risks associated with discerning authorized personnel interacting with the OT environment, such as authorized personnel intentionally, or unintentionally, creating a security vulnerability, installing malicious software, and/or the like.

Further, in an OT environment, many technologies may be utilized to automate physical and logical control functions, interact with, and measure an industrial process of the OT environment. Current information technology (IT) and OT cybersecurity systems for the industrial process may focus on IT aspects of an infrastructure of the OT environment (e.g., communication and protocol activities, network traffic patterns, intra- and inter-device connections and interactions, logs, device configurations, indicators of compromise (IOC) of vulnerabilities, and/or the like), without context and correlation to the industrial physical process and operational characteristics (e.g., temperature, pressure, flow, speed, vibration, level of precision, production quality, mechanical degradation and wear, and/or the like).

As an example, current IT and OT cybersecurity systems may focus on communications between an autonomous driving system of a vehicle and one or more other devices. However, the current IT and OT cybersecurity systems may not consider the cyber physical impact an event related to the communications between the autonomous driving system and another device has on the physical operation of the vehicle, such as a condition or situation that causes the vehicle to shift to a lower gear, causing the engine to operate at a higher rotations per minute (RPM), reducing a fuel efficiency of the vehicle, creating added mechanical strain and wear on the engine and transmission, and/or the like. Other OT systems, such as chemical processing systems, water distribution systems, manufacturing systems, transportation systems, aviation-control systems, building automation systems, and the like, similarly experience conditions where existing IT and OT cybersecurity systems evaluate network communication activities and events without added context of the status and conditions of the physical processes under control of the industrial control and automation system.

Further, focusing on the IT aspects rather than the industrial process often results in a massive quantity of false positive (statistical Type I errors) and false negative (statistical Type II errors) security alerts that may or may not be significant, since not all communication events exchanged in OT systems are necessarily material to the physical processes, nor will they necessarily always have a notable effect to the a system's physical operations, its operational safety, and its operational integrity. The massive quantity of false positive and false negative security alerts that lack the added context of the adjoining status and condition of the physical processes under control may require additional process expertise and manhours to diagnose a level of associated risk, if any, and lead to an absence, incorrect or unnecessary application of risk reducing corrective actions for a given cyber physical situation. Further, the massive quantity of false positive and false negative security alerts may cause a true security alerts to be missed, overlooked or ignored due to lack of confidence in the data set, information overload to an analyst, or an outright misinterpretation of the significance of specific alerts and sequencing of alerts.

Thus, current IT and OT cybersecurity systems waste computing resources (e.g., time, processing resources, memory resources, communication resources, and/or the like), networking resources, human resources, and/or the like associated with generating false positive and false negative security alerts, unnecessarily addressing the false positive and false negative security alerts, handling industrial process disruptions caused by the false positive and false negative security alerts and/or undetected actual security issues, and/or the like.

Some implementations described herein relate to a security system that utilizes a machine learning model to determine real-time security intelligence based on OT data and IT data. For example, the security system may receive historical OT digital and cyber physical data and historical IT digital data associated with historical system activities and may train a machine learning model with the historical OT data and the historical IT data to generate a trained machine learning model. The security system may receive real-time OT digital and cyber physical data and real-time IT digital data associated with a system. The definition of real-time, also inclusive herein of the similar concept and definition of the near real-time, includes the time during which something takes place and is available to be processed almost immediately. Thus, real-time and/or near-real time includes the time for an event to occur with a known and guaranteed level of performance, responsiveness, and negligible delay to consistently fulfill deadlines deemed sufficient to facilitate immediate actions and series of actions by computers, or in the case of near real-time events, to facilitate actions and series of actions that are considered consistently immediate by a human within a human's sense of time.

The security system may process the real-time OT data and the real-time IT data, with the trained machine learning model, to determine an event or condition trust score and an event or condition risk score for an event associated with the real-time OT data and the real-time IT data. The security system may perform one or more actions based on the trust score and the risk score.

In this way, the security system provides accurate and actionable security monitoring tools to an OT environment by utilizing a machine learning model to determine real-time security intelligence based on OT data and IT data. The real-time operational technology data and the real-time information technology data may include operational technology data and/or information technology data that is received within a predetermined amount of time after the operational technology data and/or the information technology data is generated, while the operational technology data and/or the information technology data is being processed, prior to the operational technology data and/or the information technology data being acted upon, and/or the like. Conversely, historical operational technology data and historical information technology data may include operational technology data and/or information technology data that is received after expiration of a predetermined amount of time after the operational technology data and/or the information technology data is generated, after the operational technology data and/or the information technology data has been processed, after the operational technology data and/or the information technology data has been acted upon, and/or the like.

The security system provides a high level of flexibility through which inputs to the security system may be tailored to entities of various industries, industrial application, vendor systems and devices, and also incorporate currently available sources of IT and OT data and later expand data source inputs as new sources are available. The security system may receive OT (e.g., industrial process) data, user and industrial context data, and IT data and may process the OT data, the user and industrial context data, and the IT data, with a machine learning model, to determine trust and risk scores associated with an industrial process event that may also be a sequence of events that represent interaction with the OT system. The security system may perform one or more actions based on these scores, such as escalating the industrial process event to responsible parties, adjusting operational parameters associated with the industrial process event, establishing dynamic security controls in the system or a device as a result of the industrial process event, causing the industrial process to enter an operational safe or predefined state, and/or the like. This, in turn, improves response time, conserves computing resources, networking resources, human resources, and/or the like that would otherwise have been wasted in generating false positive and false negative security alerts, unnecessarily addressing the false positive and false negative security alerts, handling industrial process disruptions caused by the false positive and false negative security alerts and/or undetected actual security issues, and/or the like.

FIGS. 1A-1E are diagrams of an example 100 associated with utilizing a machine learning model to determine real-time security intelligence based on IT data and OT data. As shown in FIGS. 1A-1E, example 100 includes a server device associated with a security system. The server device and the security system are described in greater detail below.

As shown in FIG. 1A, and by reference number 105, the security system receives historical OT data and historical IT data associated with historical systems. The historical OT data may include data associated with OT systems (e.g., industrial control systems, building automation systems, supervisory control and data acquisition systems, Internet of Things (IoT) devices, vehicle control systems, and/or the like). For example, the historical OT data may include data identifying a plurality of events associated with the historical systems, personnel associated with the plurality of events, physical locations associated with the plurality of events, access times associated with the plurality of events, access technology (e.g., wireless access technology, remote access technology, and/or the like) associated with the plurality of events, remote process activities associated with the plurality of events, remote tools associated with the plurality of events, OT system and device interactions associated with the plurality of events, data exchange associated with the plurality of events, dwell times associated with the plurality of events, security scores associated with the plurality of events, and/or the like.

Alternatively, and/or additionally, the historical OT data may include information identifying a set of devices (e.g., a human-machine interface (HMI), a field device, a sensor, an actuator, instrumentation, a programmable logic controller (PLC), a firewall device, and/or the like) included in a historical system, a network (e.g., a wireless network, a local area network (LAN), and/or the like) associated with a historical system, a log (e.g., a firewall log, an administrative log, an authentication log, system log data, and/or the like) associated with a historical system, configuration data (e.g., a maximum/minimum operating temperature, a maximum/minimum operating pressure, a rate of speed of a conveyor belt, and/or the like) associated with a historical system, information identifying a security vulnerability associated with a historical system, data associated with an industrial process (e.g., error data, fault data, alarm data, temperature data, pressure data, and/flow data, power condition data, environmental condition data, shock and vibration data, among other examples), and/or the like.

The historical IT data may include data identifying remote network access such as virtual private network (VPN) access event logs, network commands, IT device power condition data and environmental condition data, firewall logs, network traffic (e.g., a data frames, packets, a message, a data stream, and/or the like), network traffic flow, active directory logs, group policy logs, domain name system logs, message logs, and/or threat feeds (e.g., a data feed that contains information associated with a security threat, such as an identity of a device and/or a user associated with an attack, a location from which an attack is launched, and/or a type of attack (e.g., a denial of service attack), among other examples). Alternatively, and/or additionally, the historical IT data may include personnel data, location data, access data, and/or the like. The personnel data may include information identifying a type of access (e.g., unrestricted, restricted, restricted to a particular application, and/or the like) associated with a user of a system, a role associated with a user (e.g., a supervisor, an employee, and/or the like), a department or business unit associated with a user (e.g., maintenance, IT, administration, and/or the like), an application a user is authorized to utilize, a function a user is responsible to perform, a location of a workspace associated with a user (e.g., a main office, a satellite office, a home office, and/or the like), and/or a work schedule (e.g., Monday through Friday, between 8:00 am and 5:00 pm, and/or the like) associated with a user, among other examples.

The location data may include information identifying a location from which a user accessed a system. For example, the location data may include information identifying an access point through which a user accessed a system, a work space (e.g., a particular office, a particular computer, and/or the like) used to access a system, a geographic location from which a user accessed a system, and/or the like.

The access data may include information associated with a user accessing a system. For example, the access data may include information identifying a point of entry through which a user accessed a system, an access technology (e.g., Internet, Wireless, Ethernet, external direct link, and/or the like) associated with a user accessing a system, a time at which a user accessed a system, an application accessed by a user, a system accessed by a user, a function (e.g., generating a report, collecting sensor data, changing a configuration of a device, executing a test of a device, altering or downloading a file, and/or the like) performed by a user, an amount of time for which a user accessed a system, and/or the like.

In some implementations, the security system receives the historical OT data and/or the historical IT data from the server device, from a data structure (e.g., a database, a table, a list, and/or the like) associated with the security system, and/or the like. In some implementations, the security system may receive hundreds, thousands, millions, or more historical OT data and/or historical IT data associated with hundreds, thousands, millions or more historical systems that may include different devices, applications, configurations, and/or the like. The security system may receive the historical OT data and/or the historical IT data periodically (e.g., fractional seconds, minutes, hourly, daily, weekly, monthly, and/or the like), based on an occurrence of an event (e.g., historical OT data and/or historical IT data being received by the server device, an amount of available memory of the server device satisfying a threshold, and/or the like), based on providing a request for the historical OT data and/or the historical IT data to the server device, and/or the like.

Figure 1B:
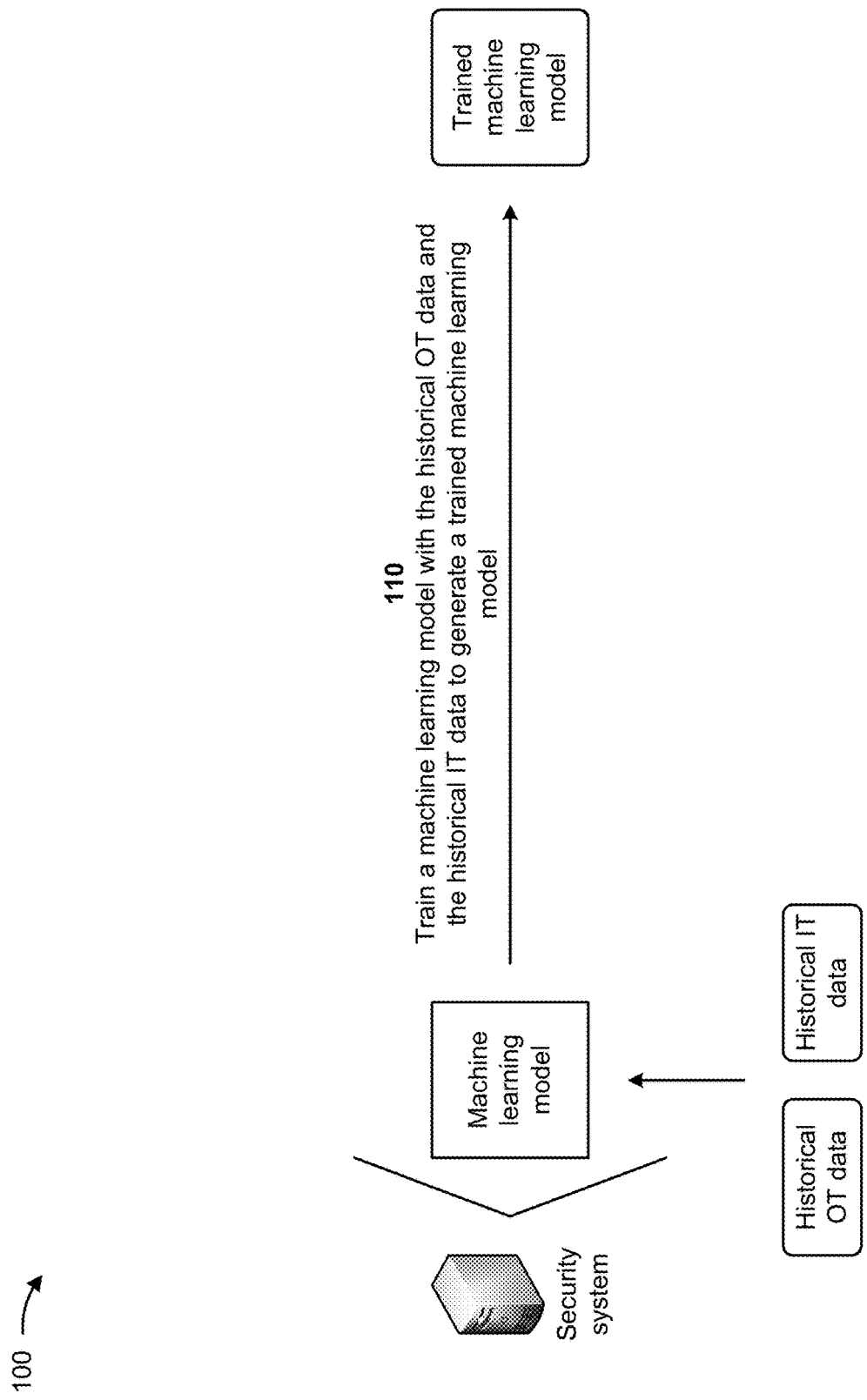

As shown in FIG. 1B, and by reference number 110, the security system trains a machine learning model with the historical OT data and the historical IT data to generate a trained machine learning model. The machine learning model may be trained to identify nuances in historical events (e.g., unusual timing for network or device access, unusual asset used to access the network or device, an event associated with a failure of a component, an event associated with a security breach, an administrative event (e.g., an upgrade of a device and/or an application), and/or the like) of historical systems based on the historical OT data and/or the historical IT data.

In some implementations, the security system trains the machine learning model to identify patterns in the historical OT data and/or the historical IT data. The security system may train the machine learning model to identify security threats, risks associated with the security threats, non-security threats, and/or the like based on the patterns and to generate the trained machine learning model.

In some implementations, the security system trains the machine learning model to determine a trust score and a risk score for an event that may also be a sequence of events associated with real-time IT data and/or real-time OT data. The machine learning model may be trained based on historical IT data and/or historical OT data relating to events and historical data relating to trust scores and risk scores with which those events are associated. The machine learning model may be trained to determine, based on IT data and/or OT data regarding an event, a trust score and a risk score with which the event is associated. Additionally, the machine learning model may be trained to determine a confidence score that reflects a measure of confidence that the trust score and the risk are accurate for this event. In some implementations, the security system trains the machine learning model in a manner similar to that described below with respect to FIG. 2.

As shown in FIG. 1C, and by reference number 115, the security system receives real-time IT data and real-time OT data associated with a system. In some implementations, the security system receives the real-time IT data and/or the real-time OT data, either directly or indirectly via one or more other devices, from the system with which the real-time IT data and/or the real-time OT data is associated. For example, a device associated with a system may stream real-time IT data and/or real-time OT data to the security system via a network.

In some implementations, the real-time OT data includes data identifying a plurality of events associated with the system, personnel associated with the plurality of events, physical locations associated with the plurality of events, access times associated with the plurality of events, access technology associated with the plurality of events, remote process activities associated with the plurality of events, remote tools associated with the plurality of events, OT interactions associated with the plurality of events, data exchange associated with the plurality of events, dwell times associated with the plurality of events, security scores associated with the plurality of events, operating system events, human-machine interface application events, tailored threat feeds, and/or the like. In some implementations, the real-time IT data includes data identifying virtual private network access event logs, firewall logs, networking traffic flow data, active directory logs, lightweight directory access protocol (LDAP) logs, group policy logs, domain name system logs, message logs, system monitor (e.g., Sysmon) logs, general threat feeds, IT device power condition data and environmental condition data, and/or the like.

As shown in FIG. 1D, and by reference number 120, the security system processes the real-time IT data and the real-time OT data, with the trained machine learning model, to determine a trust score and a risk score for an event that may also be a sequence of events associated with the real-time IT data and the real-time OT data. The event may be associated with the system associated with the real-time IT data and/or the real-time OT data. For example, the event may include a user accessing an IT systems network, a user accessing an OT systems network, a change of an operating parameter of an OT system, a harvesting of data, and/or the like.

A trust score may indicate a level of trustworthiness associated with a corresponding event based on user's characteristics and behavior associated with the event that may also be a sequence of events. The user behavior associated with the event may include one or more actions performed by a user, an access technology utilized by the user, a time of day the user performed the one or more actions, a location from which the user performed the one or more actions, whether the user commonly (e.g., a threshold quantity of times, at least once a day, and/or the like) performed the one or more actions, whether the one or more actions are associated with a role (e.g., supervisor, IT personnel, engineer, and/or the like) associated with the user, and/or the like.

In some implementations, a trust score may comprise a first value indicating that an event is trustworthy or a particular level of trustworthiness, or a second value indicating that the event is untrustworthy or a particular level of untrustworthiness. The machine learning model may determine that a trust score for an event comprises the second value based on a particular quantity of factors (described below) indicating that the event is untrustworthy, based on a particular factor being associated with the event (e.g., based on a use of phished user credentials being associated with the event), and/or the like. In some implementations, the machine learning model may determine that a trust score for the event comprises the second value when at least one factor associated with the event indicates that the event is untrustworthy. Alternatively, and/or additionally, the machine learning model may determine that a trust score for the event comprises the first value based on every factor associated with the event indicating that the event is trustworthy.

In some implementations, a trust score may fall into a range of values. For example, a trust score may have a value between 0.00 and 1.00, with a trust score of 1.00 representing a greatest level of trustworthiness and a trust score of 0.00 representing a least level of trustworthiness. Thus, an event with a trust score of 0.95 would be considered more trustworthy than an event with a trust score of 0.52.

The machine learning model may determine a trust score of an event based on numerous factors and/or relationships derived from the real-time OT data and/or the real-time IT data. For example, factors such as use of a device associated with a known, registered, and/or recognized device identifier; an event occurring at an expected time (e.g., during normal working hours associated with a user); use of an access technology commonly utilized by a user associated with the event, a geographic location associated with the event (e.g., a location of a user device associated with the event, a location associated with an IP address associated with the event, and/or the like) corresponding to a geographic location of a work space of a user associated with the event, and/or the like may increase a trust score and/or may cause the trust score to comprise the first value.

Factors such as use of a device associated with an unknown, unregistered, and/or unrecognized device identifier; an event occurring at an unexpected time (e.g., outside of normal working hours associated with a user); use of an access technology not commonly utilized by a user associated with the event, a geographic location associated with the event being different from a geographic location of a work space of a user associated with the event, and/or the like may decrease the trust score and/or cause the trust score to comprise the second value. Additionally, the machine learning model may determine a lower trust score and/or may determine that the trust score comprises the second value based on an event being associated with inappropriate activities, such as hacking, phishing, spamming, harassing of others, accessing unauthorized content, accessing unauthorized devices, accessing unauthorized systems, and/or the like.

A risk score may indicate a level of risk associated with a corresponding event resulting in an undesired consequence. For example, the risk score may indicate a level of risk that an event may result in a failure of a system, a loss of data, damage to a device, system or facility, decreased performance, efficiency or productivity, and/or the like. In some implementations, a risk score may fall into a range of values. For example, a risk score may have a value between 0.00 and 1.00, with a risk score of 1.00 representing a greatest level of risk (e.g., complete failure of an OT system, a failure resulting in causing bodily harm to an individual, loss of product, direct and indirect environmental impacts, and/or the like) and a risk score of 0.00 indicating that an event is not associated with any risk. Thus, an event with a risk score of 0.95 would be considered more risky (e.g., more likely to result in an undesired consequence) than an event with a risk score of 0.52.

The machine learning model may determine a risk score of an event based on numerous factors and relationships derived from the real-time IT data and/or the real-time OT data. For example, factors such as an operating parameter being set to a value outside a range of predetermined or safe values associated with the operating parameter, a parameter defined as a constant that is changed to a variable, a routine that with access control and change protections being disabled, an operational mode switch or the like that is altered to change control characteristics of a device (e.g., run mode, program mode, diagnostic mode, administrator mode), a likelihood of an event creating a security vulnerability satisfying a threshold, a likelihood of an event resulting in a loss of data satisfying a threshold, malicious software being installed on a device, a user accessing sensitive information via an unknown device, a quantity of systems affected by the event satisfying a threshold, and/or the like may increase a risk score. Factors such as use of a known device located in a secure workspace, an operating parameter being set to a value within a range of predetermined or safe values associated with the operating parameter, performance of a routine test of a system, a likelihood of an event creating a security vulnerability failing to satisfy a threshold, a likelihood of an event resulting in a loss of data failing to satisfy a threshold, a quantity of devices affected by the event failing to satisfy a threshold, and/or the like may decrease the risk score.

As an example, an event may be associated with a malicious actor using phished user credentials to interact with an IT VPN appliance via the Internet to gain access to an IT system network and, subsequently, to an OT systems network. The security system may receive real-time OT data and/or real-time IT data associated with the malicious user interacting with the IT VPN appliance, gaining access to the IT system network, and/or gaining access to the OT systems network. For example, the security system may receive VPN access event logs associated with the event, information associated with a user associated with the phished user credentials (e.g., a role, normal working hours, a location from which the user accesses the IT systems network and/or the OT systems network, a computing device associated with the user, and/or the like), and/or other types of OT data and/or IT data.

The security system may process the real-time IT data and/or the real-time OT data to determine one or more factors associated with the event. For example, the security system may determine that a user associated with the user credentials is authorized to remotely access the IT systems network and/or the OT systems network, a time of day at which the IT systems network and/or the OT systems network is accessed is outside of normal working hours of the user associated with the user credentials, that a geographic location associated with an IP address of a device used to interact with the IT VPN appliance is different from a geographic location associated with the user, that a device used to interact with the IT VPN appliance is not a device associated with the user (e.g., the device is not a device assigned and/or registered to the user), that remote access for the user associated with the user credentials is unusual (e.g., less than a threshold quantity of times), and/or the like.

In some implementations, the security system assigns a value to each of the one or more factors and determines the trust score based on the assigned values. In some implementations, the security system determines that a value of the trust score is a second value (e.g., a value indicating that the event is not trustworthy and/or that further action is to be taken to investigate the event, stop the occurrence of the event, mitigate an effect of the event, and/or the like) based on at least one factor associated with the event indicating that the event is untrustworthy (e.g., based on a time of day at which the IT systems network and/or the OT systems network is accessed being outside of normal working hours of the user associated with the user credentials, a geographic location associated with an IP address of a device used to interact with the IT VPN appliance being different from a geographic location associated with the user, a device used to interact with the IT VPN appliance not being a device associated with the user, remote access for the user associated with the user credentials being unusual, and/or the like).

The security system may determine one or more actions performed by the malicious actor based on the real-time IT data and/or the real-time OT data. The security system may determine a level of risk associated with each of the one or more actions and may determine a risk score associated with the event based on the level of risk associated with each of the one or more actions.

Figure 1E:
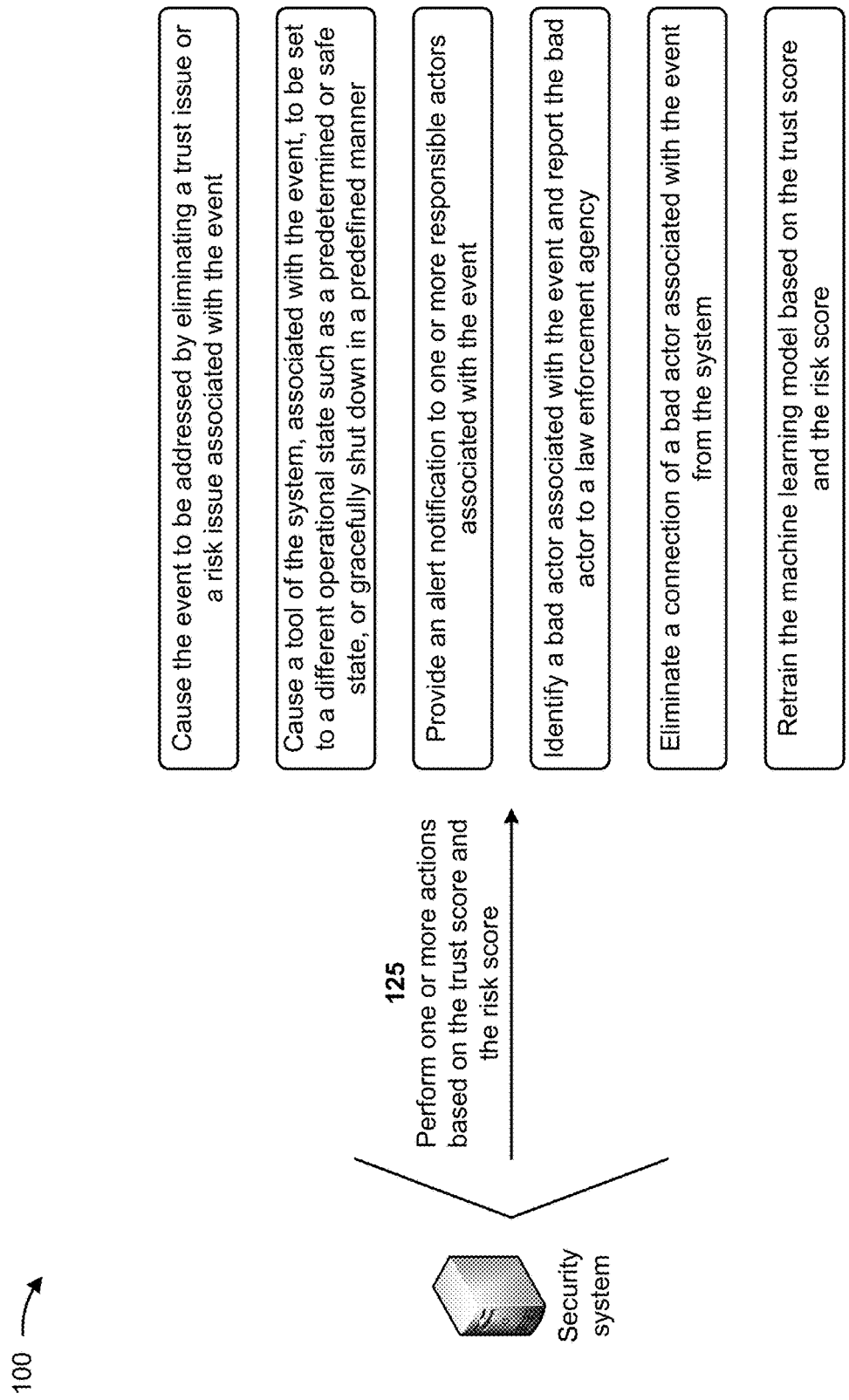

As shown in FIG. 1E, and by reference number 125, the security system performs one or more actions based on the trust score and the risk score. In some implementations, the one or more actions include the security system causing the event to be addressed by eliminating a trust issue and/or a risk issue associated with the event. For example, the security system may determine that use of an unregistered device to access an IT systems network and/or an OT systems network is a trust issue associated with the event based on the real-time IT data and/or the real-time OT data. The security system may terminate a communication session associated with the unregistered device, configure a security device (e.g., a firewall) to prevent the unregistered device from accessing the IT systems network and/or the OT systems network, may suspend a set of user credentials used to access the IT systems network and/or the OT systems network via the device, and/or the like.

In some implementations, the one or more actions include the security system causing a tool of the system, associated with the event, to be set to a different operational state such as a predetermined or safe state, or gracefully shut down in a predefined manner. For example, the security system may determine that an operating parameter of an industrial process device has been changed to a value outside of a set of safe operating parameters based on the real-time OT data and/or the real-time IT data. The security system may transmit a message to the system to cause the system to shut down the industrial process device based on the operating parameter being changed to a value outside of the set of safe operating parameters.

In some implementations, the one or more actions include the security system providing an alert notification to one or more responsible actors associated with the event. For example, the security system may identify a user and/or a device associated with the event based on the real-time IT data. The security system may provide an alert notification to the user and/or the device based on the user and/or the device being associated with the event. The notification may include information associated with the event, the trust score, the risk score, additional context relating to each score, information identifying a suggested or prescriptive next actions (e.g., a remedial action to mitigate an effect of the event) to be taken by the user, and/or the like.

In some implementations, the one or more actions include the security system identifying a bad actor associated with the event and optionally and at the pleasure of the system owner reporting the bad actor to a law enforcement agency. For example, the security system may identify a user, a device, an entity, and/or the like associated with the event based on the real-time IT data and/or the real-time OT data. The security system may determine that the event comprises a particular type of event (e.g., an event associated with an illegal activity), that the trust score satisfies a trust score threshold, and/or that the risk score satisfies a risk score threshold. The security system may optionally if desired by the system owner provide information identifying event, the user, the device, the entity, and/or the like to a device associated with an enforcement entity (e.g., a law enforcement agency, a regulatory agency, a private security entity, and/or the like) based on the event comprising the particular type of event, the trust score satisfying the trust score threshold, and/or that the risk score satisfying the risk score threshold.

In some implementations, the one or more actions include the security system retraining the machine learning model based on the trust score and the risk score. The security system may utilize the trust score and the risk score as additional training data for retraining the machine learning model, thereby increasing the quantity of training data available for training the machine learning model, and also allow the machine learning model to continue to improve in the absence of certain data sources if said data sources become unavailable by design or consequence of a malicious or unintentional event affecting the system. Accordingly, the security system may conserve computing resources associated with identifying, obtaining, and/or generating historical data for training the machine learning model relative to other systems for identifying, obtaining, and/or generating historical data for training machine learning models.

In this way, the security system utilizes a machine learning model to determine real-time security intelligence based on IT data and OT data. The security system provides a high level of flexibility through which inputs to the security system may be tailored to entities of various industries. The security system may receive OT data, user and industrial context data, and IT data and may process the OT data, the user and industrial context data, and the IT data, with a machine learning model, to determine trust and risk scores associated with an industrial process event or set of events. The security system may perform one or more actions based on these scores, such as escalating the industrial process event to responsible parties, adjusting parameters associated with the industrial process event, establishing dynamic security controls for the industrial process event, causing the industrial process event to enter a safe state, and/or the like. This, in turn, conserves time, computing resources, networking resources, human resources, and/or the like that would otherwise have been wasted in generating false positive or false negative security alerts, unnecessarily addressing the false positive and false negative security alerts, handling industrial process disruptions caused by the false positive and false negative security alerts and/or undetected actual security issues, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
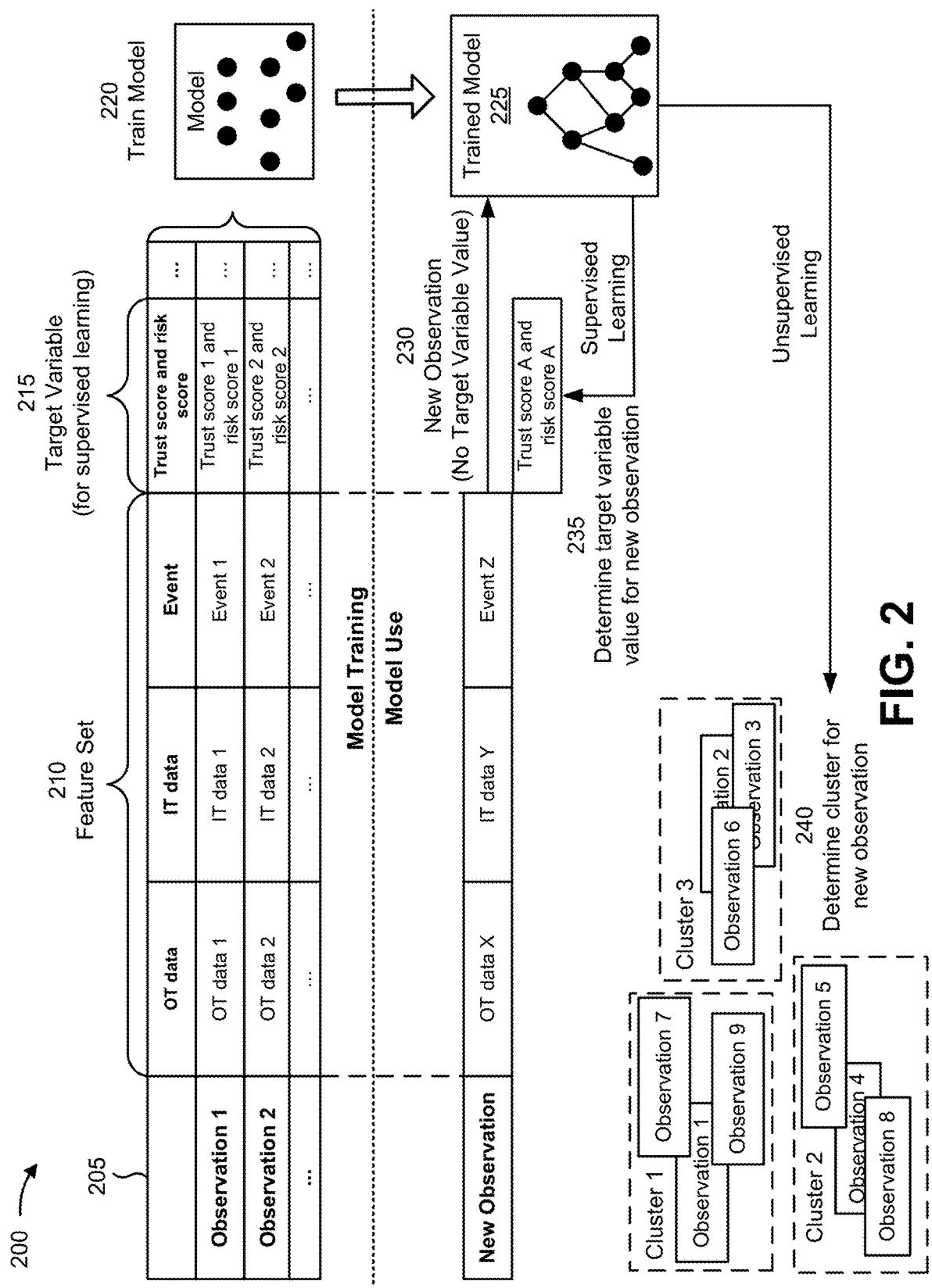
FIG. 2 is a diagram illustrating an example of training and using a machine learning model in connection with determining real-time security intelligence based on operational technology data and information technology data.

FIG. 2 is a diagram illustrating an example 200 of training and using a machine learning model in connection with determining real-time security intelligence based on OT data and IT data. The machine learning model training and usage described herein may be performed using a machine learning system. The machine learning system may include or may be included in a computing device, a server, a cloud computing environment, and/or the like, such as the security system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the security system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the security system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, an observation may be an event identified in the historical data, such as a security breach, an error condition, and/or the like. The feature set for the observation may include portions of the historical data associated with the event. For example, the event may be a security breach and the feature set may include a time at which the security breach occurred, information identifying an IP address associated with a device utilized to breach the system, information identifying a port of a device of a system through which the system was breached, information identifying a set of comprised user credentials, and/or the like.

As an example, a feature set for a set of observations may include a first feature of IT data, a second feature of OT data, a third feature of an event, and so on. As shown, for a first observation, the first feature may have a value of IT data 1, the second feature may have a value of OT data 1, the third feature may have a value of event 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a trust score and a risk score, which has a value of trust score 1 and risk score 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations. For example, the machine learning model may cluster observations based on a type of event (e.g., a denial of service attack, an unauthorized access of a system, a change in a configuration parameter of a device, and/or the like), a type of device associated with the event, and/or the like.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of OT data X, a second feature of IT data Y, a third feature of event Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict trust score A and risk score A for the target variable of the cluster for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an OT data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., an IT data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process for determining real-time security intelligence based on OT data and IT data. The machine learning system enables recognition and/or identification of tens, hundreds, thousands, or millions of features and/or feature values for tens, hundreds, thousands, or millions of observations, thereby increasing accuracy and consistency and reducing delay associated with determining real-time security intelligence based on OT data and IT data relative to requiring computing resources to be allocated for tens, hundreds, or thousands of operators to manually determine real-time security intelligence based on OT data and IT data.

As indicated above, FIG. 2 is provided as an example. Other examples may differ from what is described in connection with FIG. 2.

Figure 3:
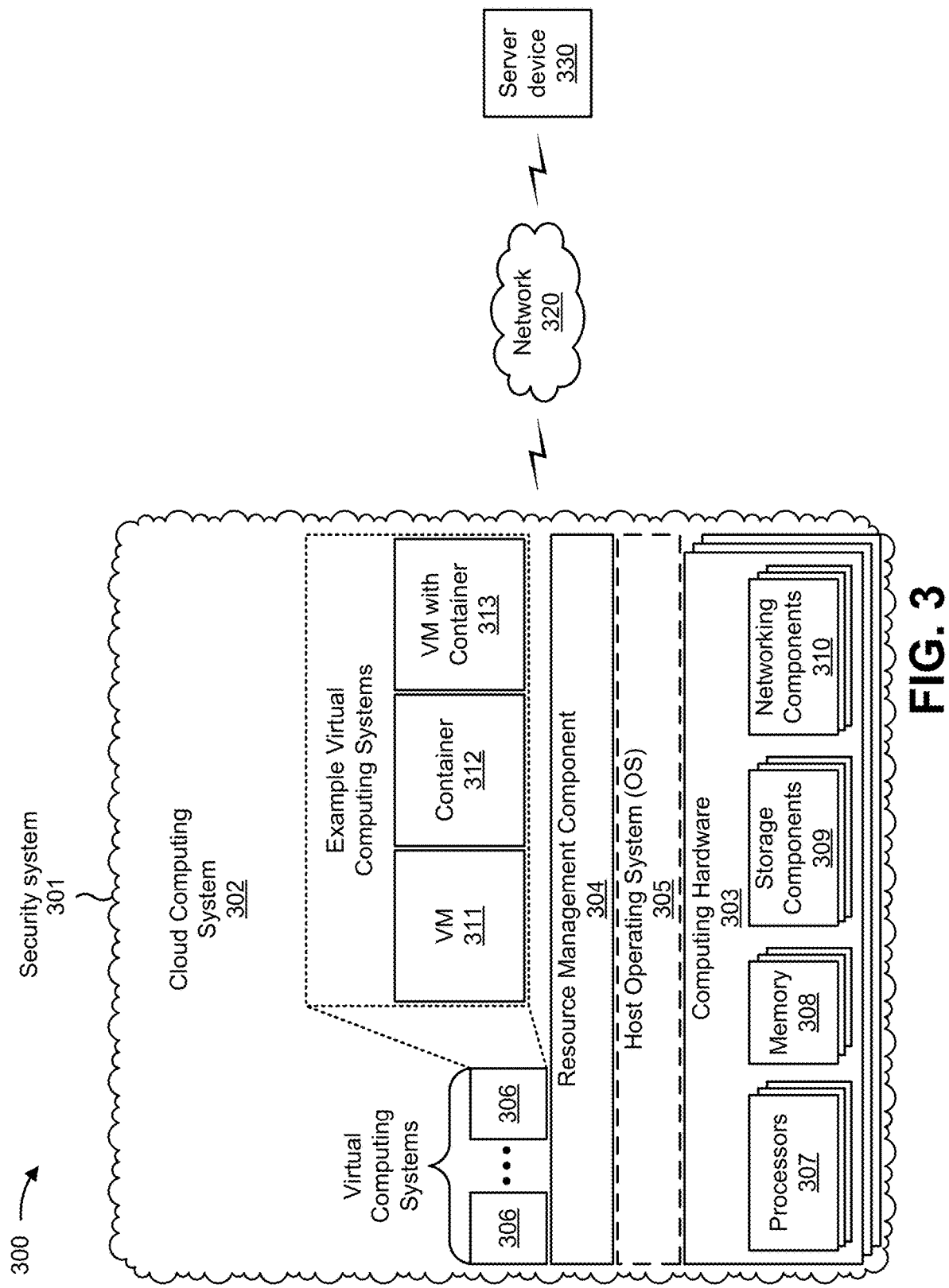
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a security system 301, which may include one or more elements of and/or may execute within a cloud computing system 302. The cloud computing system 302 may include one or more elements 303-313, as described in more detail below. As further shown in FIG. 3, environment 300 may include a network 320 and/or a server device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311.

Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the security system 301 may include one or more elements 303-313 of the cloud computing system 302, may execute within the cloud computing system 302, and/or may be hosted within the cloud computing system 302, in some implementations, the security system 301 may not be cloud-based (e.g., may be implemented outside of a cloud computing system) or may be partially cloud-based. For example, the security system 301 may include one or more devices that are not part of the cloud computing system 302, such as device 400 of FIG. 4, which may include a standalone server or another type of computing device. The security system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Server device 330 includes one or more devices capable of receiving, generating, storing, processing, providing, and/or routing information, as described elsewhere herein. Server device 330 may include a communication device and/or a computing device. For example, server device 330 may include a server, such as an application server, a client server, a web server, a database server, a host server, a proxy server, a virtual server (e.g., executing on computing hardware), or a server in a cloud computing system. In some implementations, server device 330 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
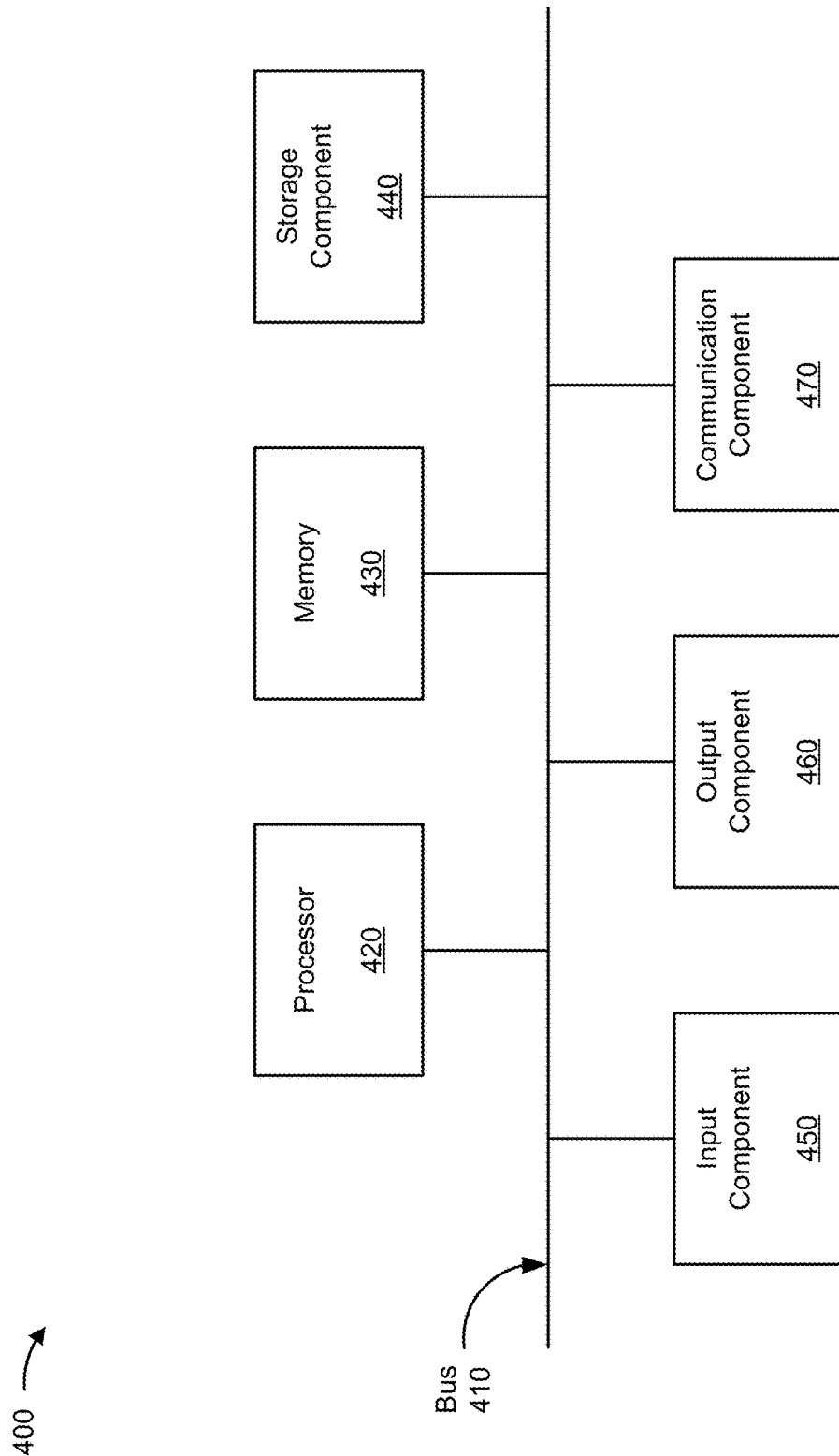
FIG. 4 is a diagram of example components of one or more devices of FIG. 3.

FIG. 4 is a diagram of example components of a device 400, which may correspond to security system 301 and/or server device 330. In some implementations, security system 301 and/or server device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for utilizing a machine learning model to determine real-time security intelligence based on OT data and IT data. In some implementations, one or more process blocks of FIG. 5 may be performed by a device (e.g., security system 301). In some implementations, one or more process blocks of FIG. 5 may be performed by another device or a group of devices separate from or including the device, such as a server device (e.g., server device 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving historical OT data and historical IT data associated with historical systems (block 510). For example, the device may receive historical OT data and historical IT data associated with historical systems, as described above.

As further shown in FIG. 5, process 500 may include training a machine learning model with the historical OT data and the historical IT data to generate a trained machine learning model (block 520). For example, the device may train a machine learning model with the historical OT data and the historical IT data to generate a trained machine learning model, as described above. The machine learning model may include a behavioral analytics model. The machine learning model may be trained to identify nuances in historical events of the historical systems based on the historical OT data and the historical IT data.

In some implementations, the device may train the machine learning model to identify patterns in the historical OT data and the historical IT data. The device may train the machine learning model to identify security threats, risks associated with the security threats, and/or non-security threats based on the patterns and to generate the trained machine learning model.

As further shown in FIG. 5, process 500 may include receiving real-time OT data and real-time IT data associated with a system (block 530). For example, the device may receive real-time OT data and real-time IT data associated with a system, as described above.

In some implementations, the real-time OT data may include data identifying a plurality of events associated with the system, personnel associated with the plurality of events, physical locations associated with the plurality of events, access times associated with the plurality of events, access technology associated with the plurality of events, remote process activities associated with the plurality of events, remote tools associated with the plurality of events, OT interactions associated with the plurality of events, data exchange associated with the plurality of events, dwelling times associated with the plurality of events, and/or security scores associated with the plurality of events.

In some implementations, the real-time IT data may include data identifying virtual private network access event logs, network commands, firewall logs, network traffic flow, active directory logs, group policy logs, domain name system logs, message logs, IT device power condition data and environmental condition data, and/or threat feeds.

As further shown in FIG. 5, process 500 may include processing the real-time OT data and the real-time IT data, with the trained machine learning model, to determine a trust score and a risk score for an event or set of events associated with the real-time OT data and the real-time IT data (block 540). For example, the device may process the real-time OT data and the real-time IT data, with the trained machine learning model, to determine a trust score and a risk score for an event associated with the real-time OT data and the real-time IT data, as described above. The event may be associated with the system associated with the real-time OT data and/or the real-time IT data. The trust score may provide an indication of user behavior associated with the event. The risk score may provide an indication of a risk to the system caused by the event.

As further shown in FIG. 5, process 500 may include performing one or more actions based on the trust score and the risk score (block 550). For example, the device may perform one or more actions based on the trust score and the risk score, as described above.

In some implementations, performing the one or more actions may include one or more of causing the event to be addressed by eliminating a trust issue or a risk issue associated with the event; causing a tool of the system, associated with the event, to be set to a different operational state such as a predetermined or safe state, or gracefully shut down in a predefined manner; or providing an alert notification, about the trust score and the risk score, to one or more responsible actors.

In some implementations, performing the one or more actions may include the device identifying a bad actor associated with the event, eliminating a connection of a bad actor associated with the event from the system and/or retraining the machine learning model based on the trust score and the risk score. In some implementations, performing the one or more actions may include the device providing the trust score and the risk score for display to one or more user devices, receiving feedback on the trust score and the risk score from the one or more user devices, and updating the machine learning model based on the feedback. In some implementations, performing the one or more actions may include the device providing a recommendation for addressing the event to one or more responsible actors, receiving feedback associated with a result of implementing the recommendation, and updating the machine learning model based on the feedback. In some implementations, performing the one or more actions may include the device providing the trust score and the risk score to an industrial control system associated with the system.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, historical operational technology data and historical information technology data associated with historical systems;
    receiving, by the device, real-time operational technology data and real-time information technology data associated with a system;
    processing, by the device, the real-time operational technology data and the real-time information technology data, with a machine learning model, to determine a trust score and a risk score for an event associated with the real-time operational technology data and the real-time information technology data; and
    performing, by the device, one or more actions based on the trust score and the risk score,
    wherein performing the one or more actions includes:
        providing a recommendation for addressing the event to one or more responsible actors;
        receiving feedback associated with a result of implementing the recommendation; and
        updating the machine learning model based on the feedback.

2. The method of claim 1, further comprising:
    training the machine learning model to identify patterns in the historical operational technology data and the historical information technology data; and
    training the machine learning model to identify security threats, risks associated with the security threats, and non-security threats based on the patterns and to generate a trained machine learning model,
    wherein the real-time operational technology data and the real-time information technology data are processed with the trained machine learning model to determine the trust score and the risk score for the event.

3. The method of claim 2, wherein the trained machine learning model is trained to identify patterns in historical events of the historical systems based on the historical operational technology data and the historical information technology data.

4. The method of claim 1, wherein the machine learning model includes a behavioral analytics model.

5. The method of claim 1, wherein the event is associated with the system.

6. The method of claim 1, wherein the real-time operational technology data includes data identifying one or more of:
   a plurality of events associated with the system,
   personnel associated with the plurality of events,
   physical locations associated with the plurality of events,
   access times associated with the plurality of events,
   access technology associated with the plurality of events,
   remote process activities associated with the plurality of events,
   remote tools associated with the plurality of events,
   operational technology interactions associated with the plurality of events,
   data exchange associated with the plurality of events,
   dwell times associated with the plurality of events, or
   security scores associated with the plurality of events.

7. The method of claim 1, wherein the trust score provides an indication of user behavior associated with the event and wherein the risk score provides an indication of a risk to the system caused by the event.

8. A device, comprising:
   one or more memories; and
   one or more processors, coupled to the one or more memories, configured to:
   receive historical operational technology data and historical information technology data associated with historical systems;
   train a machine learning model with the historical operational technology data and the historical information technology data to generate a trained machine learning model,
     wherein the trained machine learning model is trained to identify patterns in historical events of the historical systems based on the historical operational technology data and the historical information technology data;
   receive real-time operational technology data and real-time information technology data associated with a system;
   process the real-time operational technology data and the real-time information technology data, with the trained machine learning model, to determine a trust score and a risk score for an event associated with the real-time operational technology data and the real-time information technology data; and
   perform one or more actions based on the trust score and the risk score,
     wherein the one or more processors, to perform the one or more actions, are configured to:
       provide a recommendation for addressing the event to one or more responsible actors;
       receive feedback associated with a result of implementing the recommendation; and
       update the machine learning model based on the feedback.

9. The device of claim 8, wherein the one or more processors, to perform the one or more actions, are configured to:
   cause the event to be addressed by eliminating a trust issue or a risk issue associated with the event;
   cause a tool of the system, associated with the event, to be set to a different operational state, or shut down in a predefined manner; or
   provide an alert notification, about the trust score and the risk score, to the one or more responsible actors.

10. The device of claim 8, wherein the one or more processors, to perform the one or more actions, are configured to:
    identify a bad actor associated with the event;
    eliminate a connection of the bad actor associated with the event from the system; or
    retrain the machine learning model based on the trust score and the risk score.

11. The device of claim 8, wherein the one or more processors, to perform the one or more actions, are configured to:
    provide the trust score and the risk score for display to one or more user devices;
    receive feedback on the trust score and the risk score from the one or more user devices; and
    update the machine learning model based on the feedback.

12. The device of claim 8, wherein the real-time information technology data includes data identifying one or more of:
    remote network access,
    network commands,
    firewall logs,
    information technology device power condition data,
    information technology device environmental condition data,
    network traffic flow,
    active directory logs,
    group policy logs,
    domain name system logs,
    message logs, or
    threat feeds.

13. The device of claim 8, wherein the real-time operational technology data includes one or more of:
    a temperature data indicating a temperature associated with a component or a process associated with the system,
    pressure data indicating a pressure associated with the component or the process associated with the system,
    flow data indicating a flow of a fluid associated with the component or the process associated with the system,
    speed data indicating a speed associated with the component or the process associated with the system,
    vibration data indicating a vibration associated with the component or the process associated with the system,
    information indicating a power condition associated with the system,
    information indicating a health condition associated with the system,
    information indicating a usage condition associated with the system,
    information associated with environmental condition monitoring,
    information indicating a level of wear associated with the component of the system,
    information indicating a level of precision associated with the component or the process associated with the system, or
    information indicating a production quality associated with the system.

14. The device of claim 8, wherein the machine learning model includes a behavioral analytics model.

15. A non-transitory computer-readable medium storing a set of instructions, the set of instructions comprising:
    one or more instructions that, when executed by one or more processors of a device, cause the device to:

receive real-time operational technology data and real-time information technology data associated with a system;

process the real-time operational technology data and the real-time information technology data, with a machine learning model, to determine a trust score and a risk score for an event associated with the real-time operational technology data and the real-time information technology data; and perform one or more actions based on the trust score and the risk score,
wherein the one or more instructions, that cause the device to perform the one or more actions, cause the device to:
provide a recommendation for addressing the event to one or more responsible actors;
receive feedback associated with a result of implementing the recommendation; and
update the machine learning model based on the feedback.

16. The non-transitory computer-readable medium of claim 15, wherein the one or more instructions further cause the device to:
train the machine learning model to identify patterns in historical operational technology data and historical information technology data; and
train the machine learning model to identify security threats, risks associated with the security threats, and non-security threats based on the patterns.

17. The non-transitory computer-readable medium of claim 15, wherein the trust score provides an indication of user behavior associated with the event and wherein the risk score provides an indication of a risk to the system caused by the event.

18. The non-transitory computer-readable medium of claim 15, wherein the one or more instructions, that cause the device to perform the one or more actions, cause the device to one or more of:
cause the event to be addressed by eliminating a trust issue or a risk issue associated with the event;
cause a tool of the system, associated with the event, to be set to a different operational state, or shut down in a predefined manner;
provide an alert notification, about the trust score and the risk score, to one or more responsible actors;
identify a bad actor associated with the event;
eliminate a connection of a bad actor associated with the event from the system; or
retrain the machine learning model based on the trust score and the risk score.

19. The non-transitory computer-readable medium of claim 15, wherein the one or more instructions, that cause the device to perform one or more actions, cause the device to:
provide the trust score and the risk score for display to one or more user devices;
receive feedback on the trust score and the risk score from the one or more user devices; and
update the machine learning model based on the feedback.

20. The non-transitory computer-readable medium of claim 15, wherein the machine learning model includes a behavioral analytics model.

* * * * *